May 17, 1932.  W. D. BURGER  1,859,071
GREASE METERING DEVICE
Filed Sept. 17, 1929  2 Sheets-Sheet 1

Witness
William P. Kilroy

Inventor
Walter D. Burger
By Samuel W. Banning Atty

Patented May 17, 1932

1,859,071

UNITED STATES PATENT OFFICE

WALTER D. BURGER, OF FOREST PARK, ILLINOIS

GREASE METERING DEVICE

Application filed September 17, 1929. Serial No. 393,259.

This invention relates to grease metering devices.

An object of the invention is to provide a dependable device for accurately measuring the amount of grease dispensed from a reservoir and wherein means are interposed in a delivery conduit and provided with an element adapted to be rotated by the passage of grease therethrough, said element being connected to a suitable device for visually indicating the amount of grease dispensed.

Another object of the invention is to provide a metering device wherein an outer sleeve is employed through which the grease is adapted to pass, and means utilized within the sleeve and operated by the passage of the grease therethrough for imparting rotation to the sleeve, such rotation being transmitted through suitable gearing to a registering device.

A still further object of the invention is to provide a rotor in the form of a sleeve, and a stator disposed within the sleeve, the rotor and stator being provided with inter-related vanes, adapted to be operated by grease passing through the device, said stator and rotor being so designed as not to depend solely upon velocity of the grease for operation in the manner of a turbine, but rather upon the viscosity and consistency of the grease, the vanes of the stator being arranged to direct the grease flow at an angle to the vanes carried by the rotor to impart rotation to the latter.

Still another object of the invention is to provide a rotor in the form of a cylindrical tube, and a stator within said tube, the stator being provided with helical ribs or vanes tapering from the inlet to the outlet end of the tube or sleeve, and the rotor being provided with cooperating vanes or ribs extending parallel with the axis of the tube and conforming longitudinally with the tapered or conical form of the stator vanes, whereby pressure is maintained uniformly within said tube to effect uniform rotation of rotor when grease is passing through the tube.

Figure 1:
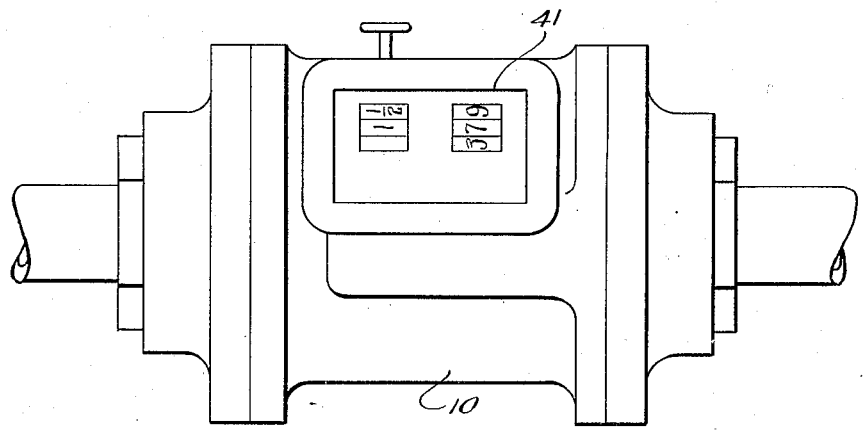
Figure 2:
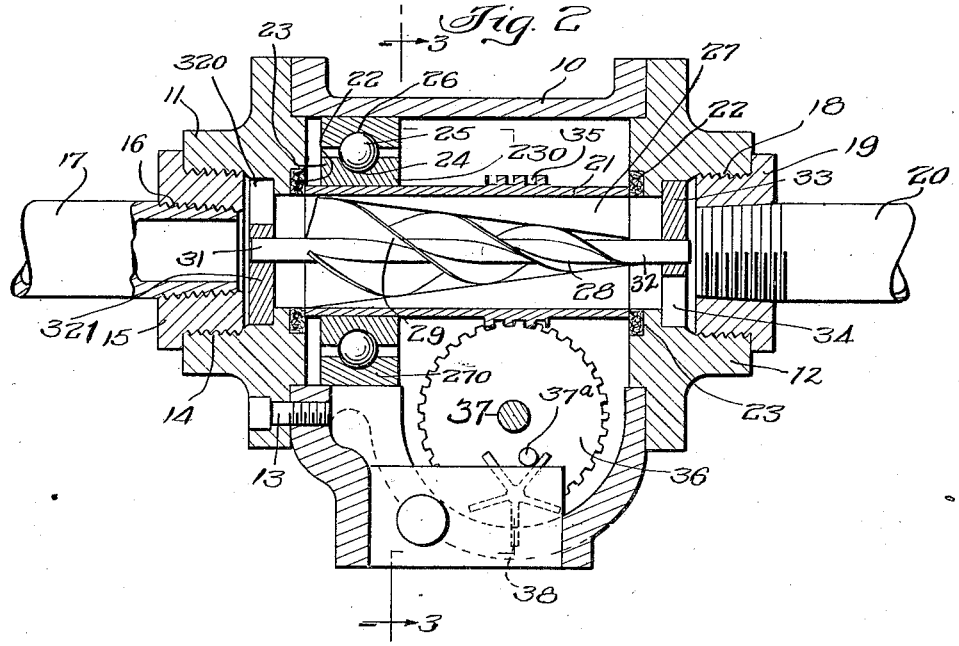
Figure 3:
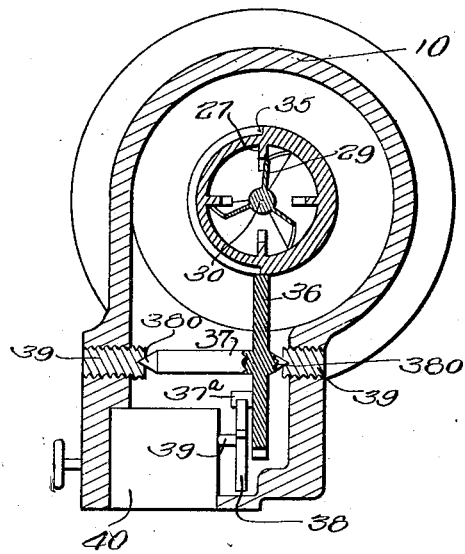
Figure 4:
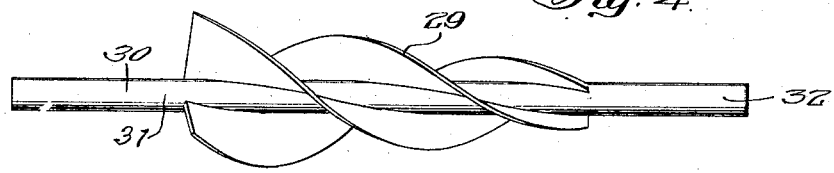
Figure 5:
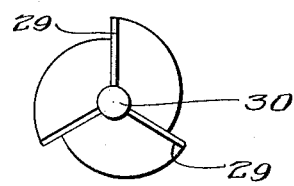

Other and further objects of the invention will appear from the specification and claims hereinafter following:

In drawings forming a part of the specification Fig. 1 is a side elevational view of the metering device. Fig. 2 is a longitudinal vertical section taken through the metering device. Fig. 3 is a transverse vertical sectional view of the device corresponding substantially to the line 3—3 of Fig. 2. Fig. 4 is an enlarged elevational view of the stator employed in connection with the invention. Fig. 5 is an end elevational view of said stator.

As shown in the drawings, the invention includes a suitable generally cylindrical casing 10 having end members 11 and 12 suitably secured thereto by screws, one of which is indicated at 13 in Fig. 2. The end member 11 is provided with an interiorly threaded nipple 14 adapted for the reception of a threaded nut 15. The nut 15 is provided with a threaded bore 16 adapted to accommodate the threaded end of a pipe 17 leading to a suitable grease reservoir, not shown, the latter ordinarily being equipped with a pump to force grease through the conduit 17 and into the casing 10. The end member 12 of the casing is also provided with a threaded nipple 18, adapted for the reception of a nut 19 which accommodates the threaded end of a pipe 20 adapted to communicate with the interior of the casing, and to form the delivery pipe for the grease.

Rotatably mounted within the casing 10 is an elongated tubular sleeve 21, the opposite ends of said sleeves bearing against packing 22 accommodated in suitable recesses 23 provided in the inner surfaces of the end members 11 and 12. The sleeve 21 has rigidly affixed thereto, adjacent one end, a collar 230 of substantial width, provided with an annular groove 24 forming a ball race. Disposed in the groove 24 is a series of balls 25 which also bear in the race 26 formed in a ring 270 which is rigidly mounted in the tubular casing 10, the construction being of such character that the sleeve 21 is supported for rotation by the bearing described. The interior of the tube or sleeve 21 is provided with a plurality of vanes 27 preferably four in number and extending longitudinally from one end of the sleeve to the other, and disposed radially with reference to the axis of said tube. The vanes increase radially in width from the inlet end of the tube or sleeve to the outlet end thereof, being relatively wide, adjacent the outlet end, and tapering to a point adjacent the inlet end of the tube.

Adapted to co-operate with the vanes or ribs 27 of the sleeve or rotor 21 is a stator element 28. The stator element, as best shown in Figures 2 and 4 is conical in shape, having its larger end disposed adjacent to the inlet end of the sleeve 21, and tapering to its smallest size adjacent the outlet end of the tube or sleeve. The stator element 28 is provided with helical ribs or vanes 29 which provide the conical formation thereof, the helical vanes or ribs preferably being three in number and extending the entire length of the rotor. These helical vanes or ribs form part of, or may be mounted upon an axially extending support 30, having end portions 31 and 32. The end portion 31 is rigidly mounted in a spider 321 carried by the end member 11, the spider providing suitable openings 320 through which the grease is adapted to pass. The end 32 of the stator is fixedly mounted in a spider 33 carried by the end member 12, the spider 33 likewise providing openings 34 through which the grease is adapted to pass. The diameter of the rotor from the largest end to the smaller end, is such that the inner edges of the vanes 27 will just clear the outermost edges of the helical ribs, to permit rotation of the sleeve 21.

Formed upon the sleeve 21 is a worm 35 adapted to co-operate with a worm gear 36, the latter gear being mounted upon a shaft 37 having tapered end portions 380 mounted in bearings 39—39 carried by the walls of the casing, the gear 36 being mounted in this way for rotation with a minimum resistance in the bearings. Upon one side of the gear 36 in an eccentric position, there is provided a stud 37ª adapted to co-operate with a star-wheel 38, the star-wheel being mounted upon a shaft 39 adapted to transmit motion to a counting mechanism 40 of any suitable type, the casing being provided with an opening through which the indicating characters of the counting mechanism may be visible. The counting mechanism forms no part of the present invention except so far as it enters into combination therewith, and may be of any suitable type readily obtainable in the open market, which will answer the purpose.

In use when grease is forced from the reservoir through the pipe 17 it enters the device through the openings provided in the spider 321, and thence passes into the end of the sleeve or tube 21 which provides the rotor of the mechanism, at the same time entering the helical grooves provided by the helical ribs 29. As the grease passes along these grooves it follows the helical paths defined by the ribs and of course expands radially, cutting across the vanes 27 of the rotor 21, and as it travels from the inlet end of the device toward the outlet end, the grease progressively cuts across a greater width of the vanes 27 due to the tapering formation thereof and to the conical formation of the stator element 28, thereby progressively bringing into effect a greater quantity of the grease to bear upon the vanes 27 of the rotor, rotation being imparted to the latter, which is transmitted to the worm-wheel 36, the star-wheel 38 and the counting mechanism 40 as will be appreciated, the grease finding an exit through the spider 33 into the pipe 20, by which it is delivered at the place intended, the amount of grease being accurately measured by the counting device during its passage through the meter.

An important feature of the invention resides in providing a rotor through which the grease passes, and taking off motion from the surface of an exteriorly positioned rotor; further due to the formation of the vanes or ribs of the rotor and stator, the grease, through its coherence and body and not through its velocity, imparts a positive rotation to the rotor in a manner different from a turbine which depends upon the velocity of the actuating medium. Due to the conical form of the stator and the tapering formation of the vanes of the rotor the grease, in its passage through the rotor and stator, is forced to cut across the vanes of the rotor to impart rotation thereto and prevent the grease following the channels defined by the vanes of the rotor.

I am aware of the existence of certain turbine devices for measuring thin fluids such as gasoline and other liquids, but all of these devices are unsuitable for use in connection with the handling of grease for the reason that when the grease is forced through the turbine, instead of imparting rotation to the rotor, the grease merely follows the channels defined by the parts without bringing about rotation of the same. Due to the tapered formation of the vanes in my device and to the provision of the rotatable sleeve through which the grease passes, the grease is compressed within the sleeve and forced to cut across the vanes of the rotor and because of its viscosity, coherence, and somewhat compressed state, positive and uniform rotation of the rotor is made to take place.

While I have shown and described what I now consider the preferred manner of carrying out my invention the same is merely illustrative and I contemplate all changes and modifications that come within the scope of the claims appended hereto.

I claim:

1. In a grease metering device, the combination with a tubular rotor through which grease is adapted to be passed; of a stator disposed within the rotor; vanes disposed in radial planes within said tubular rotor and extending longitudinally thereof, and helical vanes extending spirally from end to end of said stator and adapted to cooperate with the vanes of said rotor.

2. In a grease metering device, the combination with a tubular rotor having an inlet and an outlet; of a stator disposed within the rotor; longitudinally extending vanes within said rotor extending inwardly toward the axial center thereof in radial planes, said vanes increasing in width from said inlet toward said outlet; and a stator disposed within said rotor and provided with helical vanes, said vanes diminishing in their radial dimensions from the inlet of said rotor to the outlet thereof, and conforming to the vanes in said rotor.

3. In a device of the character described the combination with a housing having an inlet and an outlet; of a tubular member rotatably mounted in said housing in position to communicate with the inlet and outlet thereof, said tubular member being provided with axially extending ribs extending inwardly in radial planes converging toward the axis of said rotor; a stator arranged within said rotor and supported from said housing, said stator being provided with vanes intersecting the planes in which the rotor vanes lie, said stator being arranged in line with the inlet and outlet openings of said housing.

4. In a device of the character described the combination with a housing having an inlet and an outlet; of a tubular member rotatably mounted in said housing in position to communicate with the inlet and outlet thereof, said tubular member being provided with interior axially extending ribs disposed in radial planes; a stator arranged within said rotor and supported from said housing, said stator being provided with vanes intersecting at acute angles the planes in which the rotor vanes lie, said stator being arranged in line with the inlet and outlet openings of said housing, said rotor being provided with an exteriorly arranged worm; a worm-wheel cooperating with said worm, said worm-wheel being provided with an eccentrically mounted stud; and a star-wheel adapted to be connected to a counting mechanism and operated by engagement with said stud.

5. In a device of the character described the combination with a housing having an inlet and an outlet; of a stator conical in form and having means providing helical grooves, said means being conical in shape with the widest radial dimension adjacent the inlet of said housing and the narrowest radial dimension adjacent the outlet of said housing; of a cylindrical tubular rotor surrounding said stator and having interior longitudinally extending vanes, said vanes having their narrowest radial dimension adjacent the inlet of said housing and widening radially as they approach the outlet of said housing.

6. In a device of the character described the combination with a housing having an inlet and an outlet; of a stator conical in form and having means providing helical grooves, said means being conical in shape with the widest radial dimension adjacent the inlet of said housing and the narrowest radial dimension adjacent the outlet of said housing; of a cylindrical tubular rotor surrounding said stator and having interior longitudinally extending vanes, said vanes having their narrowest radial dimension adjacent the inlet of said housing and widening radially as they approach the outlet of said housing, and gearing adapted to be connected to counting mechanism, said gearing having an operative connection with the exterior of said rotor.

In witness that I claim the foregoing I have hereunto subscribed my name this 30th day of August, 1929.

WALTER D. BURGER.